United States Patent [19]

Délcour

[11] 4,408,708

[45] Oct. 11, 1983

[54] METHOD OF SECURING PREFABRICATED LAGGING COMPONENTS TO A METAL SURFACE, AND A PREFABRICATED LAGGING COMPONENT FOR USE IN THE METHOD

[75] Inventor: Leon J. E. Delcour, Liege, Belgium

[73] Assignee: Cockerill Sambre, Seraing, Belgium

[21] Appl. No.: 252,290

[22] Filed: Apr. 9, 1981

[30] Foreign Application Priority Data

Apr. 11, 1980 [BE] Belgium ................................ 200196

[51] Int. Cl.$^3$ ................................ B23K 31/00

[52] U.S. Cl. ................................ 228/139; 432/234

[58] Field of Search ............... 228/139, 140, 175, 176, 228/165; 138/145, 146, 147; 432/3, 76, 234; 29/455 R; 219/98, 99

[56] References Cited

U.S. PATENT DOCUMENTS 3,486,533 12/1969 Doherty et al. ................ 432/234 X
3,624,340 11/1971 Hinden ................................ 219/99
3,702,024 11/1972 Baker ................................ 228/139 X
3,848,034 11/1974 Schaefer ................................ 432/3 X
3,909,907 10/1975 Davis ................................ 29/455 R X
4,032,742 6/1977 Kendrick et al. ..................... 219/99
4,070,151 1/1978 Suey ................................ 432/234
4,120,641 10/1978 Myles ................................ 432/3
4,170,451 10/1979 Luff ................................ 138/147 X
4,222,337 9/1980 Christiansen ................... 228/140 X

*Primary Examiner*—Kenneth J. Ramsey
*Assistant Examiner*—M. Jordan
*Attorney, Agent, or Firm*—Young & Thompson

[57] ABSTRACT

A method of securing a lagging component to a metal surface, comprising: positioning a prefabricated lagged component having one or more holes on the metal surface; inserting a securing element into each hole of the lagging component until its end touches the metal surface; welding the securing element to the surface using a welding gun; and filling the remaining hole cavity with a packing material around the securing element. The securing element is held in place prior to welding by a cardboard retainer.

3 Claims, 6 Drawing Figures

METHOD OF SECURING PREFABRICATED LAGGING COMPONENTS TO A METAL SURFACE SURFACE, AND A PREFABRICATED LAGGING COMPONENT FOR USE IN THE METHOD

DESCRIPTION OF THE BACKGROUND OF THE INVENTION

The present invention relates to a method of securing prefabricated lagging components to a metal surface and to a prefabricated lagging component for use in carrying out the method.

Metal surfaces have to be lagged, e.g. in the case of metal tubes at high temperatures in heating and heat-treatment furnaces, in order to protect the tubes and keep them away from the action of flames. The same problem occurs in connection with furnace flues or ducts conveying products or ventilation shafts and the like.

There are a number of methods of lagging the surfaces to be protected, but all are substantially based on two processes. In the first process the lagging material, e.g. a refractory material, is positioned on the metal surface before being shaped. It is cast or tamped on to the surface in a formwork made for the purpose and secured to the surface by a large number of studs on the surface to be protected. Before being used, the resulting lagging must be carefully and uniformly dried so that the material does not contain regions at different tensions or having different structures such as to produce faults such as cracks and/or blisters, since such faults may reduce the efficiency of the lagging and even cause damage resulting in the disappearance of the lagging over relatively large areas of surface, thus requiring repairs which are always very difficult and expensive and interfere with the operation of the device in question. The disadvantages of the method are that it requires closely-packed securing studs, operator specialized in the laying of lagging material, a long drying process and, possibly, difficult and expensive repairs. The reliability of the lagging is not absolute and the surface protection depends not only on the physical properties of the material used but also on the quality of the positioning work. Finally, the close-packed securing means make it practically impossible to insert an insulating lining between the metal surface and the refractory lining.

The second process consists in using prefabricated lagging components (conventionally called shells) which are positioned on the surface to be protected and secured bu fitting together or by metal attachments which are fixed or previously placed on the surface to be protected. The method has a disadvantage in that the lagging components, when fitted together, are fragile at the places where they fit together, are relatively expensive per linear meter, and can be secured only to vertical surfaces. When the components are secured by metal attachments, laborious work is required for securing the attachments to the surface to be protected. In some cases each component has to be adjusted and in other cases it has to be preassembled. In addition, prefabricated components frequently break down and the resulting lagging is also expensive per linear meter.

SUMMARY OF THE INVENTION

The invention aims to provide a method of securing prefabricated lagging components, the method being free of the disadvantages of known methods and providing a rapid, economic method of manufacturing lagging having high efficiency and reliability.

Accordingly, the present invention provides a method of securing a lagging component to a metal surface, comprising: positioning a prefabricated lagging component having one or more holes on the metal surface; inserting a securing element into each hole of the lagging component until its end touches the metal surface; welding the securing element to the surface using a welding gun; and filling the remaining hole cavity with a packing material around the securing element.

In order that the invention may be readily understood, an embodiment thereof will now be described, by way of example, with reference to the accompanying drawings, in which.

DETAILED DESCRIPTION OF THE INVENTION

Figure 1:
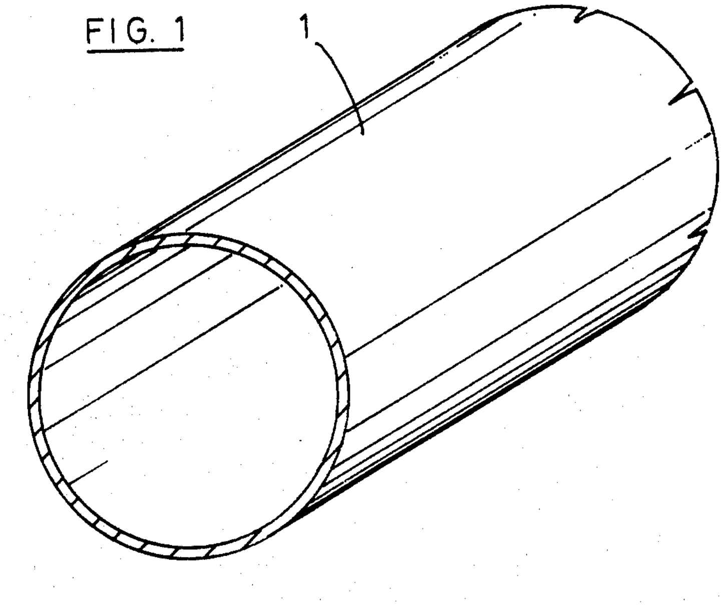
FIG. 1 is a perspective view of a portion of metal tube to be lagged by a method embodying the invention.
Figure 2:
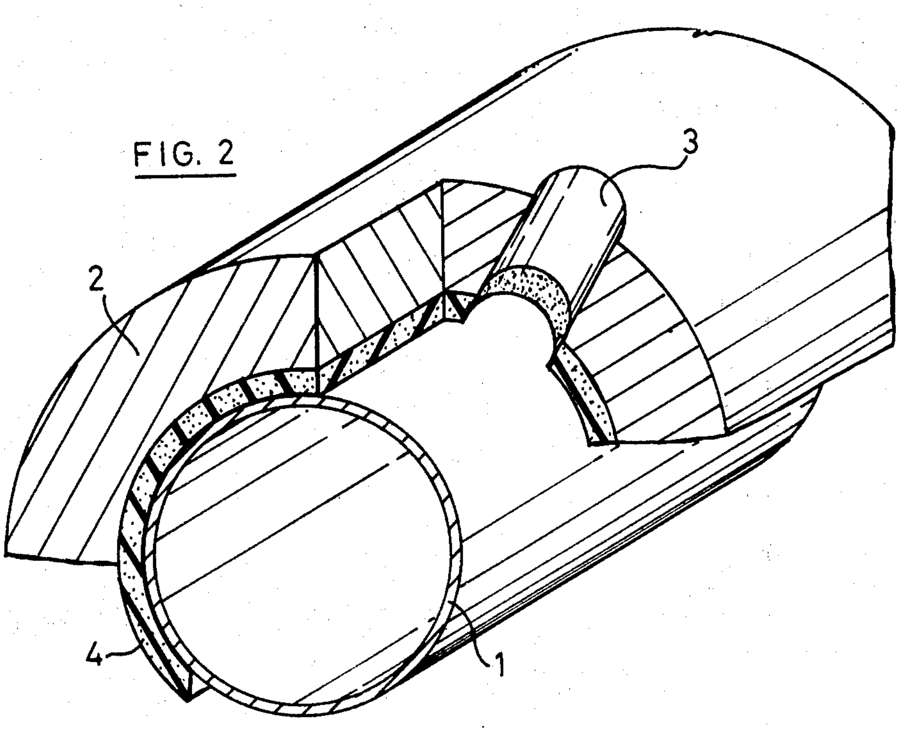
FIGS. 2 to 4 are sketches illustrating the steps of a method embodying the invention.

FIG. 1 shows a portion of a cylindrical metal tube 1 bearing an external protective lining. In a method embodying the invention, as shown in FIG. 2, the lagging is made up of prefabricated components 2, e.g. of refractory material, each formed with one or more holes 3, e.g. four holes 40 mm in diameter in the case of a component 30 cm long. Each lagging component 2 is positioned on the outer surface of the tube 1 (FIG. 2), if required with inter-position of a layer of insulating material 4 (e.g. a ceramic felt 1 or 2 cm in diameter) between the surface of tube 1 and the lagging component 2. This insulating layer can be stuck to the inner surface of component 2 before it is positioned on the outer surface of tube 1.

Figure 3:
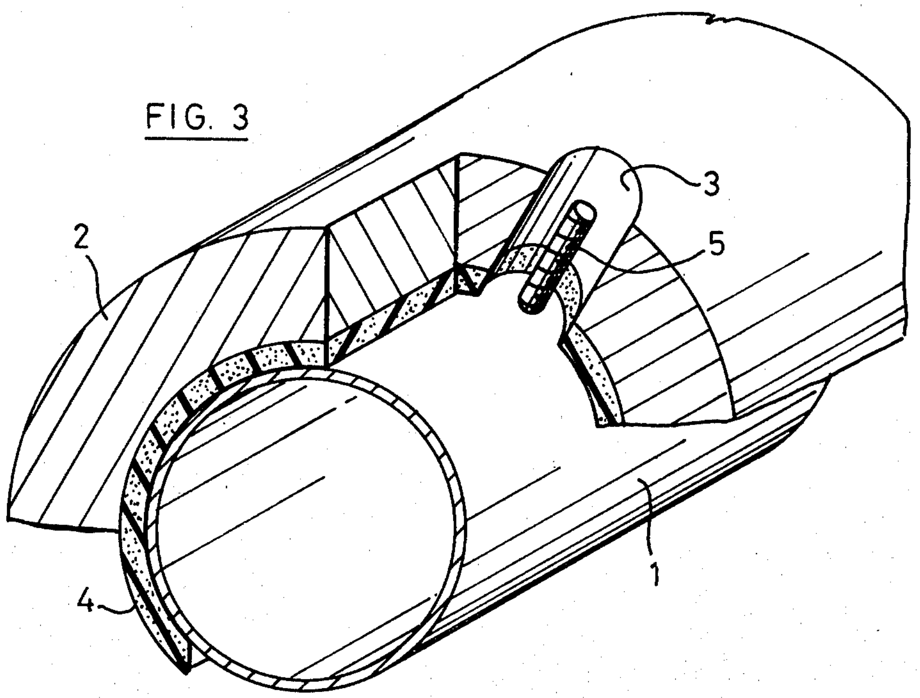
Figure 4:
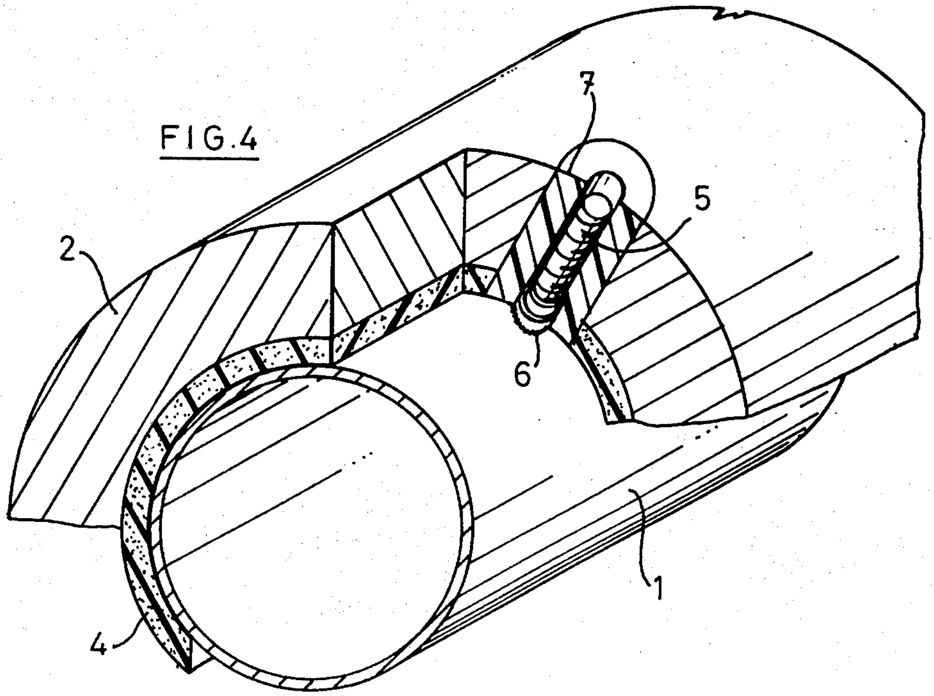

After being positioned, each lagging component 2 is secured to tube 1 by elements 5 (FIG. 3) which are welded to the outer surface of tube 1 at the bottom of holes 3. FIG. 3 shows a securing element in the form of a threaded stud. The length of the studs is such that, when they are welded to tube 1, their free end is some distance from the outer surface of component 2. The securing elements 5 can be welded by using a gun, e.g. a modified KSM gun, for welding studs to metal walls. The gun is connected to an electric discharge unit and has a supporting base and a mandrel chosen in dependence on the diameter of element 5. The length of the base and mandrel are adapted to the thickness of the lining to be installed. An element 5 is welded to the surface of tube 1 by applying slight pressure from the gun onto the surface of the tube in order to position element 5 and the base inside hole 3, whereupon the electric welding discharge is initiated. The remaining space in holes 3 around the studs is filled with a packing material 7 (FIG. 4) e.g. the material known under the commercial name Thermiplast 456 P.C. A. nut 6 can be screwed to studs 5 to attach the packing material. Studs 5 can also be formed with a forged head.

Components 2 are positioned and secured one after another so as to leave a small gap, e.g. 2 mm wide, between each pair of adjacent components, so that the components are completely independent during mechanical or thermal stresses, if any. According to one special feature of the aforementioned process, the securing studs are positioned and welded after the prefabricated lagging components 2 have been positioned and adjusted.

The advantages of the method embodying the invention are that it does not require any pre-assembly since the prefabricated lagging components are secured after being positioned, and the securing elements are few in number and easy to manufacture, so that the lagging components can be positioned rapidly and economically.

Figure 5:
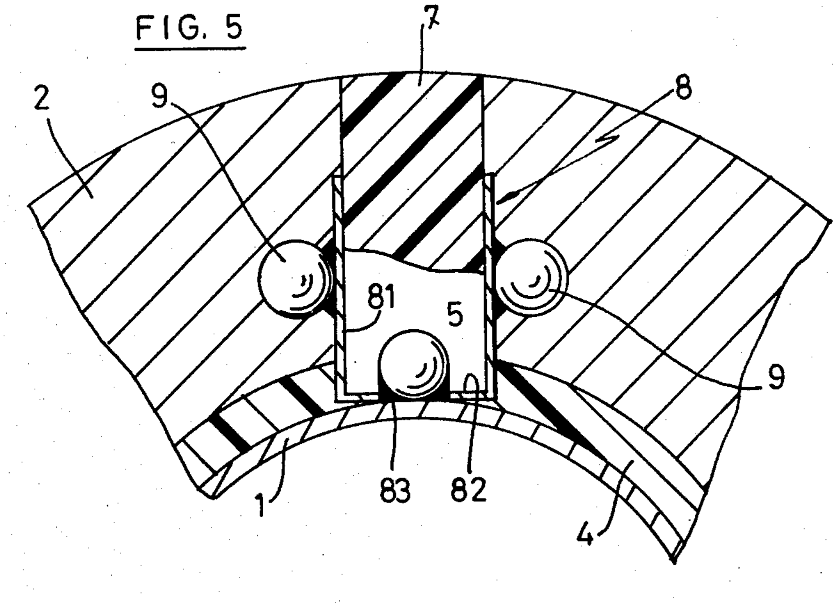
FIG. 5 is a view in section of an assembly illustrating a variant embodiment.

FIG. 5 illustrates a variant embodiment, in cross-section through asembly 1, 2, 4 across the diameter of a hole 3. Hole 3 has a sleeve 8 having a cylindrical metal wall 81 made e.g. of stainless steel and a base 82 treated so as to be electrically insulating. The base is formed with an aperture 83. In FIG. 5, the securing element 5 is a metal ball which is welded to the wall of tube 1 after being positioned in aperture 83 of sleeve 8. Balls 9, which are welded to the outer wall of sleeve 8, hold the sleeve relative to component 2. Accordingly, components 2, after being fitted with sleeves 8, are brought and positioned on tube 1, whereupon the securing balls 5 are inserted into holes 3, positioned in apertures 83 in sleeves 8 and welded to tube 1.

Figure 6:
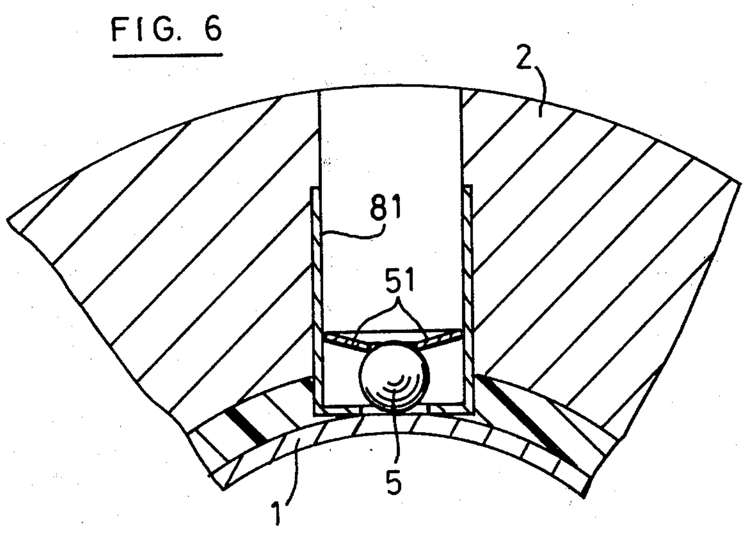
FIG. 6 is a view in section illustrating a variant of the embodiment of FIG. 5.

The securing element 5 can be inserted into sleeve 8 and welded to the wall of tube 1 after the lagging component has been positioned on tube 1. Alternatively, the securing element 5 can be disposed in sleeve 8 before the lagging component is positioned, and can be held there e.g. by a cardboard washer 51 as shown in FIG. 6. Washer 51 has a diameter slightly more than the inner diameter of sleeve 8, and a central aperture exposing the surface of element 5. During the welding process, the head of the welding gun will eject the washer and come in contact with the surface of element 5, thus closing the electric surface and heating element 5, so that the cardboard bursts into flame. Thus, all the lagging components can be provided with securing means before being positioned, thereby facilitating the positioning process and saving time.

Of course, the aforementioned description of the invention as applied to a tube is not intended to be limiting; the invention applies to any metal surface requiring to be covered.

I claim:

1. A method of securing a lagging component to a metal surface, comprising: positioning a prefabricated lagging component on the metal surface, said lagging component having one or more holes lined with a hollow sleeve having a base formed with an aperture, each hollow sleeve containing a securing element held by a cardboard washer having an aperture revealing part of the surface of the corresponding securing component; welding the securing element to the surface using a welding gun; and filling the remaining hole cavity with a packing material around the securing element.

2. A prefabricated lagging component formed with one or more holes each lined with an internal hollow sleeve having a base formed with an aperture, each hollow sleeve containing a securing element held by a cardboard washer having an aperture revealing part of the surface of the corresponding securing component.

3. A prefabricated lagging component according to claim 2, in which the surface of the lagging component adapted to face the metal surface is coated with an electrically insulating layer.

* * * * *